United States Patent
Karaoguz et al.

(10) Patent No.: US 8,391,928 B2
(45) Date of Patent: *Mar. 5, 2013

(54) SIMULTANEOUSLY MULTI-NETWORKED HANDHELD MULTIMEDIA GATEWAYS

(75) Inventors: Jeyhan Karaoguz, Irvine, CA (US); Noel B. Whitley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,346

(22) Filed: Dec. 2, 2011

(65) Prior Publication Data

US 2012/0076123 A1    Mar. 29, 2012

Related U.S. Application Data

(63) Continuation of application No. 11/256,836, filed on Oct. 24, 2005, now Pat. No. 8,073,492.

(51) Int. Cl.
*H04M 1/00* (2006.01)

(52) U.S. Cl. ............ 455/566; 455/557; 455/553.1; 455/552.1; 455/550.1; 455/466; 715/764; 715/700; 725/39; 725/40; 725/41; 725/43; 725/48

(58) Field of Classification Search .......... 455/566, 455/557, 553.1, 552.1, 550.1, 466, 418, 419; 715/764, 700; 725/39, 40, 41, 43, 48
See application file for complete search history.

(56) References Cited

U.S. PATENT DOCUMENTS

| | | | |
|---|---|---|---|
| 5,797,089 A | 8/1998 | Nguyen | |
| 7,205,959 B2 | 4/2007 | Henriksson | |
| 7,703,017 B2 * | 4/2010 | Mise et al. | 715/730 |
| 8,073,492 B2 * | 12/2011 | Karaoguz et al. | 455/566 |
| 2001/0034697 A1 * | 10/2001 | Kaen | 705/37 |
| 2001/0048482 A1 | 12/2001 | Takemoto | |
| 2002/0059434 A1 | 5/2002 | Karaoguz et al. | |
| 2002/0142764 A1 | 10/2002 | Newell et al. | |
| 2002/0198021 A1 | 12/2002 | Boesen | |
| 2003/0100308 A1 | 5/2003 | Rusch | |
| 2003/0227939 A1 | 12/2003 | Yukie et al. | |
| 2004/0017513 A1 * | 1/2004 | Takahashi | 348/552 |
| 2004/0214541 A1 | 10/2004 | Choi | |
| 2005/0007452 A1 * | 1/2005 | McKay et al. | 348/143 |
| 2005/0044571 A1 | 2/2005 | Goldman | |
| 2005/0052341 A1 | 3/2005 | Henriksson | |
| 2005/0073617 A1 | 4/2005 | Takahashi | |
| 2005/0170798 A1 | 8/2005 | Maalismaa et al. | |
| 2005/0198560 A1 * | 9/2005 | Seo et al. | 715/500.1 |

(Continued)

FOREIGN PATENT DOCUMENTS

WO    2005076503    8/2005

OTHER PUBLICATIONS

European Patent Office Search Report dated Apr. 27, 2010 for App. No. EP 06 01 4373.

*Primary Examiner* — Charles Appiah
*Assistant Examiner* — Khai M Nguyen
(74) *Attorney, Agent, or Firm* — Brinks Hofer Gilson & Lione

(57) ABSTRACT

A user may simultaneously access sources of multimedia information via multiple wireless networks using a handheld multimedia gateway. A user interface may support the selection of information services that are each provided separate, but possibly overlapping, viewing spaces. Circuitry in the multimedia gateway manages the operation of the multiple wireless communication paths, and enables the display of visual information through two or more display devices. The user may customize the display, the size, and the location within a display of regions in which the information is presented.

14 Claims, 9 Drawing Sheets

U.S. PATENT DOCUMENTS

| | | |
|---|---|---|
| 2007/0134645 A1 | 6/2007 | Henriksson |
| 2007/0191070 A1 | 8/2007 | Rao |
| 2007/0275762 A1 | 11/2007 | Aaltone et al. |
| 2008/0104658 A1 | 5/2008 | Lim |
| 2008/0158189 A1 | 7/2008 | Kim |
| 2009/0064016 A1 | 3/2009 | Li et al. |
| 2009/0298545 A1 * | 12/2009 | Kittel et al. .................. 455/566 |

* cited by examiner

SIMULTANEOUSLY MULTI-NETWORKED HANDHELD MULTIMEDIA GATEWAYS

RELATED APPLICATIONS

This patent application is a continuation of U.S. patent application Ser. No. 11/256,836, filed Oct, 24, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Communication via wireless networks is growing rapidly, and the capabilities of handheld devices used for the consumption of multimedia information support the consumption of voice, music, still images, and video up to and including full motion content. High speed digital connectivity may be provided via a number of wireless networking technologies including those compliant with the Global System For Mobile Communications (GSM) Packet Radio Service (GPRS), Enhanced Data for Global Evolution (EDGE), High Speed Packet Data Access (HSPDA), CDMA 2000 1xEV-DO and 1xEV-DV, Institute of Electrical and Electronics Engineers (IEEE) 802.11a/b/g/n-compatible wireless local area networks (WLANs), IEEE 802.16 compatible wireless wide area networks (WiMAX), and Digital Video Broadcasting-Handheld (DVB-H) specifications, to name only a few.

Current handheld multimedia-capable devices typically support access to only one wireless network at a time, and users wishing to simultaneously consume multimedia information from multiple networks normally do so via communication sessions separated in time, and usually utilizing a separate access devices for each physical network accessed. For example, those wishing to simultaneously access full motion news video via a wireless local area network and streaming stock quotes via a wireless text messaging facility must do so using separate physical devices. If the user's wireless device is capable of accessing both information sources, it must normally be done in separate communication sessions, where the user consumes information from a first source, and then switches to a second source, in a mutually exclusive form of consumption.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method supporting communicating via simultaneously multi-networked handheld multimedia gateways, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to the exchange and consumption of multimedia information in a wireless mobile environment. More specifically, certain embodiments of the present invention relate to the simultaneous exchange of multimedia information via multiple, independent wireless communication paths, and to devices and systems supporting user management of the way in which such information is made available to the user.

Aspect of the present invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network. In a representative embodiment of the present invention, a user of a wireless access device may engage in simultaneous communication of multimedia information via multiple wireless networks providing service at their present location, and may be provided with flexibility and control over the manner in which such information is presented for consumption.

Figure 1A:
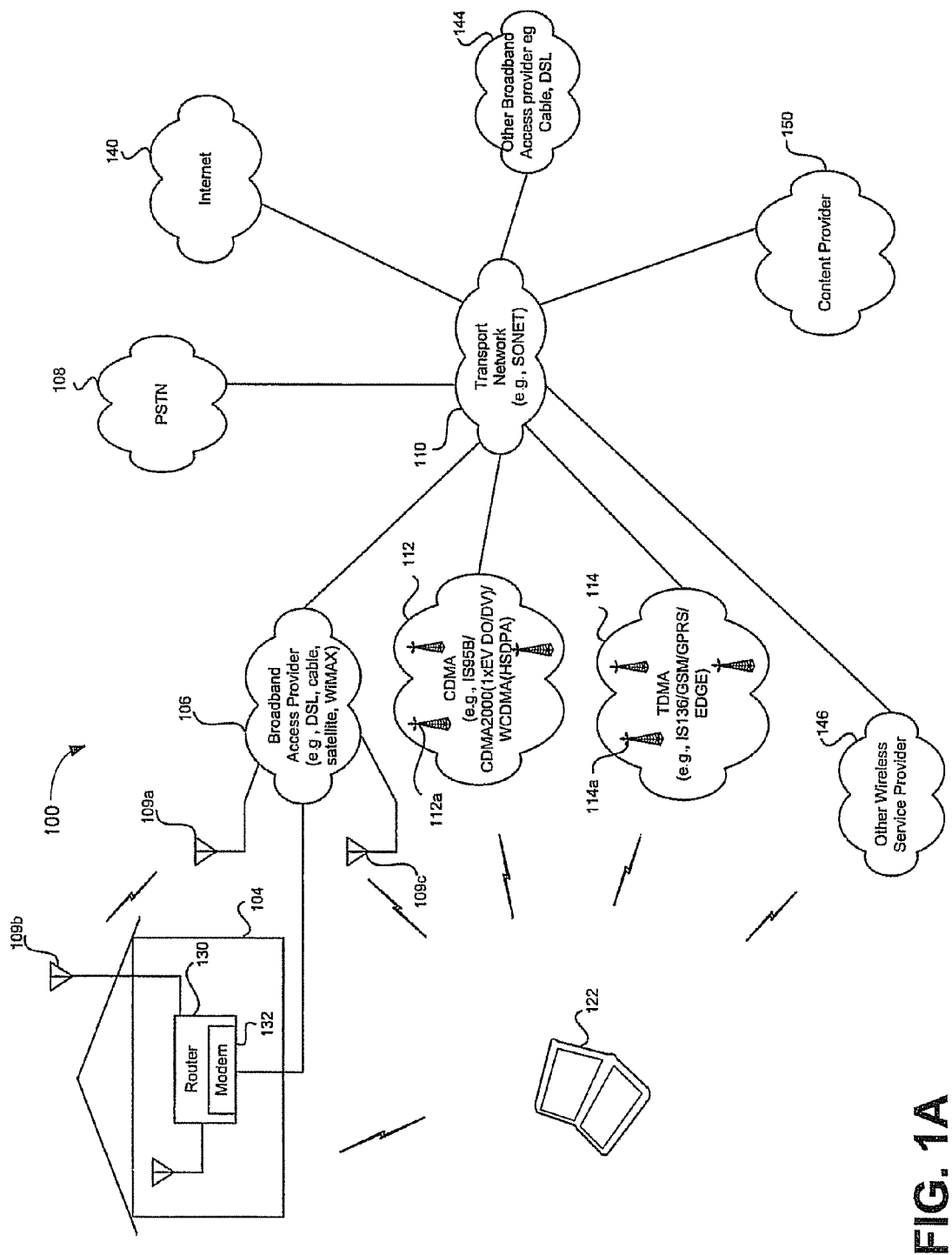
FIG. 1A is a block diagram illustrating an architecture of an exemplary communications system in which a representative embodiment of the present invention may be practiced.

FIG. 1A is a block diagram illustrating an architecture of an exemplary communications system 100 in which a representative embodiment of the present invention may be practiced. The communication system 100 of FIG. 1A shows a location 104, a broadband access provider (BAP) 106, a public switched telephone network (PSTN) 108, a transport network 110, wireless service provider networks including a CDMA network 112 and a GSM/EDGE/GPRS network 114, and an access device 122. The access devices 122 may comprise, for example, a mobile multimedia handset having a high level of functionality such as, for example, that of one or more of a digital video or still camera, a portable audio (MP3) player, a personal digital assistant, and a voice handset. The access devices 122 may be capable of operating using multiple, separate, wireless information paths such as, for example, personal area networks and/or wireless local area, wide area, and metropolitan area networks compliant with, for example, Bluetooth, IEEE 802.11a/b/g/n, IEEE 802.15.3a ultra-wideband, IEEE 802.16, and DVB-H standards. In addition, the access device may comprise one or more displays for the consumption of multimedia information. In a representative embodiment of the present invention, an access device such as the access device 122 may be capable of accessing, managing, and displaying/presenting to a user multiple streams of multimedia information content originating from independent information sources and delivered via independent physical paths.

As shown in FIG. 1A, the location 104 comprises a router 130 having a modem 132. In various representative embodiments of the present invention, the location 104 may comprise a plurality of wireless access devices (not shown) such as, for example, personal computer (PC), a laptop and a wireless personal digital assistant (PDA). A peripheral such as a digital camera may be coupled to the personal computer. Other peripherals such as printers, digital scanners, speakers, and the like, which are also not shown, may also be coupled to the personal computer and/or laptop.

FIG. 1A also comprises an "other broadband access provider" block 144, an "other wireless service provider" block 146 and content provider 150. The "other broadband access provider block 144" may be, for example, a cable, DSL, or other type of broadband access provider.

The broadband access provider 106 may be, for example, a cable operator, telephone company, wireless wide area network (WAN), wireless metropolitan area network (MAN) or satellite operator providing Internet access along with other communication services. In instances where BAP 106 is a telephone company, broadband service to location 104 may be provided via DSL or other broadband access technology. Accordingly, the modem 132 may be a DSL modem. In instances where BAP 106 is a cable operator, broadband service to location 104 may be provided via cable. Accordingly, the modem 132 may be DOCSIS compliant or other type of cable modem. In instances where BAP 106 is a wireless wide area network or wireless metropolitan area network provider, the modem 132 may be compatible with a wireless wide area networking standard such as, for example, IEEE 802.16. Given the rapid decrease in the cost of leased telephone lines over the past decade or more, the connection to the location 104 may also be T1 or T3 connections. For example, a switch located at a central office (CO) (not shown) may be utilized to couple a T1 or T3 connection between the location 104 and the PSTN 108.

In other embodiments of the present invention, the location 104 may be equipped with a wireless broadband gateway and modem in place of the router 130 having a modem 132. The gateway may comprise an integrated or external DSL modem, cable modem, wireless wide area network interface or other high-speed modem that may be required for handling a connection such as a DSL, T1, T3, and/or IEEE 802.16 connection. The gateway may be adapted so that it has access to protocol stack information that may be related to the CDMA and/or TDMA networks 112, 114, respectively. The gateway may also be adapted to provide protocol support for communication with "other wireless service provider" block 146.

The CDMA network 112 may comprise a wireless network compliant with any of, for example, the EIA/TIA IS-95, CDMA2000 1xEV DO/DV, and Wideband CDMA (WCDMA) standards. The TDMA network 114 may comprise a wireless network compliant with any of the EIA/TIA IS-136, Global System for Mobile Communications (GSM), GSM Packet Radio Service (GPRS), and Enhanced Data for Global Evolution (EDGE) standards, for example. Each of the CDMA and TDMA networks 112, 114 may comprise a plurality of cell sites (a/k/a cellular towers) that are located in geographical cells within each of the networks. Within the CDMA and TDMA networks 112, 114, each of the cell sites such as, for example, the cell sites 112a, 114a of FIG. 1A may comprise a base transceiver station (BTS), and one or more base transceiver stations (BTSs) may be coupled to wireless carrier central offices (not shown). The wireless carrier central offices may comprise base station controllers/radio network controllers (BSCs/RNCs), and one or more base station controllers/radio network controllers (BSCs/RNCs) may be coupled to the a core network comprising a network edge switch called a mobile switching center (MSC), not shown. Depending upon the air interface technology in use, other infrastructure elements may also be present within the CDMA and TDMA networks 112, 114. The mobile switching center of either the CDMA network 112 or TDMA network 114 may be coupled to, for example, the PSTN 108 via the transport network 110.

As mentioned above, the BAP 106 may provide broadband service to the location 104 via, for example, a wireless wide area or wireless metropolitan area network, as shown by antennas 109a, 109b coupling the BAP 106 and the location 104. Wireless wide area network service may also be provided directly to the access device 122 by the BAP 106 such as, for example, via antenna 109c. Although separate antennas 109a, 109c are shown for communication with the router/gateway 130 at location 104 and the access device 122, respectively, this is solely for reason of explanation, and does not represent a specific limitation of the present invention.

The other wireless service provider 146 may, for example, provide wireless wideband service using transmission adhering to the Digital Video Broadcast-Handheld (DVB-H) standards specification developed under the auspices of the European Telecommunications Standards Institute (ETSI). Such standards support the operation of single frequency networks, and have been tailored to the mobility and operating requirements of handheld device users.

As an access device moves such as, for example, the access device 122 moves about within the service areas of the BAP 106, CDMA network 112, TDMA network 114, and other wireless service provider 146, the access device may enjoy satisfactory coverage from multiple wireless service providers. In instances where communication is established via a cellular service provider such as, for example, the CDMA network 112 or TDMA network 114, the access device 122 may move out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. At various times while within the service areas of the above-described wireless network, however, a user of the access device 122 may have available a plurality of wireless paths via which multimedia content may be simultaneously exchanged.

Figure 1B:
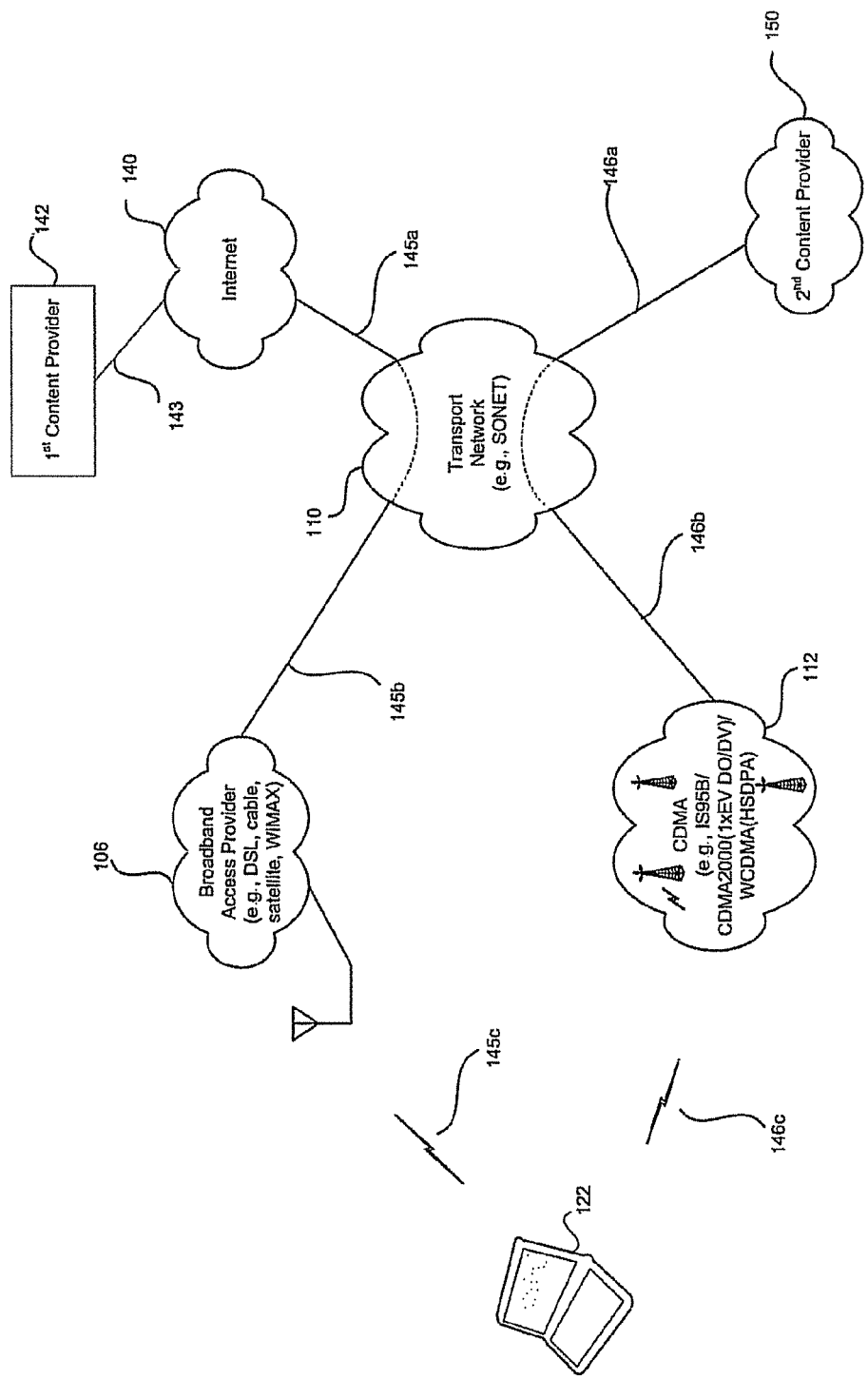
FIG. 1B is a block diagram showing an architecture of a communications system that may correspond to, for example, a portion of the communication system of FIG. 1A, in accordance with a representative embodiment of the present invention.

FIG. 1B is a block diagram showing an architecture of a communications system 100 that may correspond to, for example, a portion of the communication system 100 of FIG. 1A, in accordance with a representative embodiment of the present invention. The communication system 100 of FIG. 1B comprises two, logically independent communication paths linking an access device 122 to the first and second content providers 142, 150. Although only two paths are shown in the illustration of FIG. 1B, the present invention is not specifically limited in this regard. A greater number of separate, wireless communication paths may be employed by an access device such as, for example, the access device 122, in the exchange of multimedia information, without departing from the spirit or scope of the present invention.

The illustration of FIG. 1B shows the first communication path comprising a content provider 1 142 exchanging a first stream of multimedia information via a wired and/or wireless communication link 143 with an Internet network 140. The multimedia content is passed between the Internet network 140 and a transport network 110 via a wired and/or wireless communication link 145*a*. In the illustration of FIG. 1B, the transport network 110 communicates via wired and/or wireless communication link 145*b* with the BAP 106, which provides service to the access device 122 via a first wireless communication link 145*c*. The second communication path shown in FIG. 1B comprises a second content provider 150 exchanging multimedia information via a wired and/or wireless communication link 146*a* with the transport network 110. Multimedia information is passed via a wireless and/or wireless communication link 146*b* between the transport network 110 and a CDMA network 112. The CDMA network 112 supports communication via a second wireless communication link 146*c* for the exchange of the multimedia information with the access device 122. The access device 122 of FIG. 1B may correspond to the access device 122 of FIG. 1A, for example.

In a representative embodiment of the present invention, an access device such as, for example, the access device 122 of FIG. 1B may not only support multiple wireless communication paths for exchange of multimedia information over a wider geographic area such as, for example, the communication paths comprising communication links 145*a*, 145*b*, 145*c* and 146*a*, 146*b*, 146*c* described above, but may also support a wireless link to local external devices used for the consumption of the multimedia information that may be exchanged using the multiple, independent, wider area communication paths 145*a/b/c* and 146*a/b/c*. Two such external media devices are illustrated in FIG. 1B as the wireless video display 118, and the wireless speaker 116, which are linked to the access device 122 by wireless link 147. The wireless video display 118 may comprise, for example, a conventional video monitor with an adjunct wireless interface compatible with that on the access device 122, a wall-mounted plasma or liquid crystal display with integrated wireless circuitry, a projection TV device with a wireless interface, or a personal computer (PC) with an integrated wireless interface, that enable the display of multimedia content received and passed on by the access device 122. Similarly, the wireless speaker 116 may comprise a one or more conventional speakers with a receiver/amplifier for receiving audio content passed wirelessly from the access device 122, or may comprise a complete entertainment system with integrated receiver compatible with the wireless transmissions of the access device 122. Other external media devices may include, for example, wireless headsets, media recorders/players, and similar devices. The wireless link 147 may comprise a limited range radio frequency communication path such as, for example, a Bluetooth, IEEE 802.15.3a, IEEE 802.11 a/b/g/n or other local or short range wireless network technology.

In a representative embodiment of the present invention, the use of the wireless communication link 147 may be concurrent with the use of the wireless communication links 145*c*,146*c* allowing, for example, simultaneous communication via a wide area network in one communication mode, while participating via another, independent communication path. For example, one wireless communication path (e.g., wireless link 146*c*) may be employed for cellular voice communication, while a second wireless communication path (e.g., wireless link 145*c*) may be used to support consumption of DVB-H streaming video content, which may be passed by the access device 122 via a third wireless communication path (e.g., wireless communication link 147) to a large screen video display for consumption by a group.

In the example of FIG. 1B, the two communication paths share a common element in the transport network 110. This, however, does not represent a specific limitation of the present invention. The various communication paths of a representative embodiment of the present invention may share network elements, or be completely disjoint. In addition, the first and second paths in the illustration of FIG. 1B are presented for the purpose of explanation of one representative embodiment of the present invention, and are not intended to represent specific limitations of the present invention to a particular combination of network elements. Various combinations of network elements may be employed in each of the communication paths linking content providers and an access device like the access device 122 of FIG. 1B, without departing from the spirit and scope of the present invention.

In a representative embodiment of the present invention, an access device such as, for example, the access device 122 of FIG. 1B may exchange a plurality of independent streams of multimedia information via separate and distinct wireless communication interfaces. Providing user access to each stream of multimedia information may involve the playback of streaming digitized video, digitized broadcast video, digitized audio, digitized still images, textual information, and application data. The simultaneous support of such multimedia exchange and consumption activities via multiple wireless networks using an access device such as the access device 122 of FIG. 1B may involve decoding multiple encoded video streams (MPEG2, MPEG4), where the video streams employ the same or different encoding methods. The decoding of encoded materials for each stream may be handled by separated processing means (e.g., a separate digital signal processor) for the multimedia information stream of each wireless communication interface, or may employ one processing means (e.g., a single digital signal processor) in a manner that allows it to perform the processing required for the consumption of all of the streams of multimedia information.

The management of a battery resource may be impacted by the particular wireless interface standards selected for use. For example, some air interface standards employ bursty transmissions to mobile devices, thus permitting the receiving device to power down between transmissions and save battery power.

Figure 2:
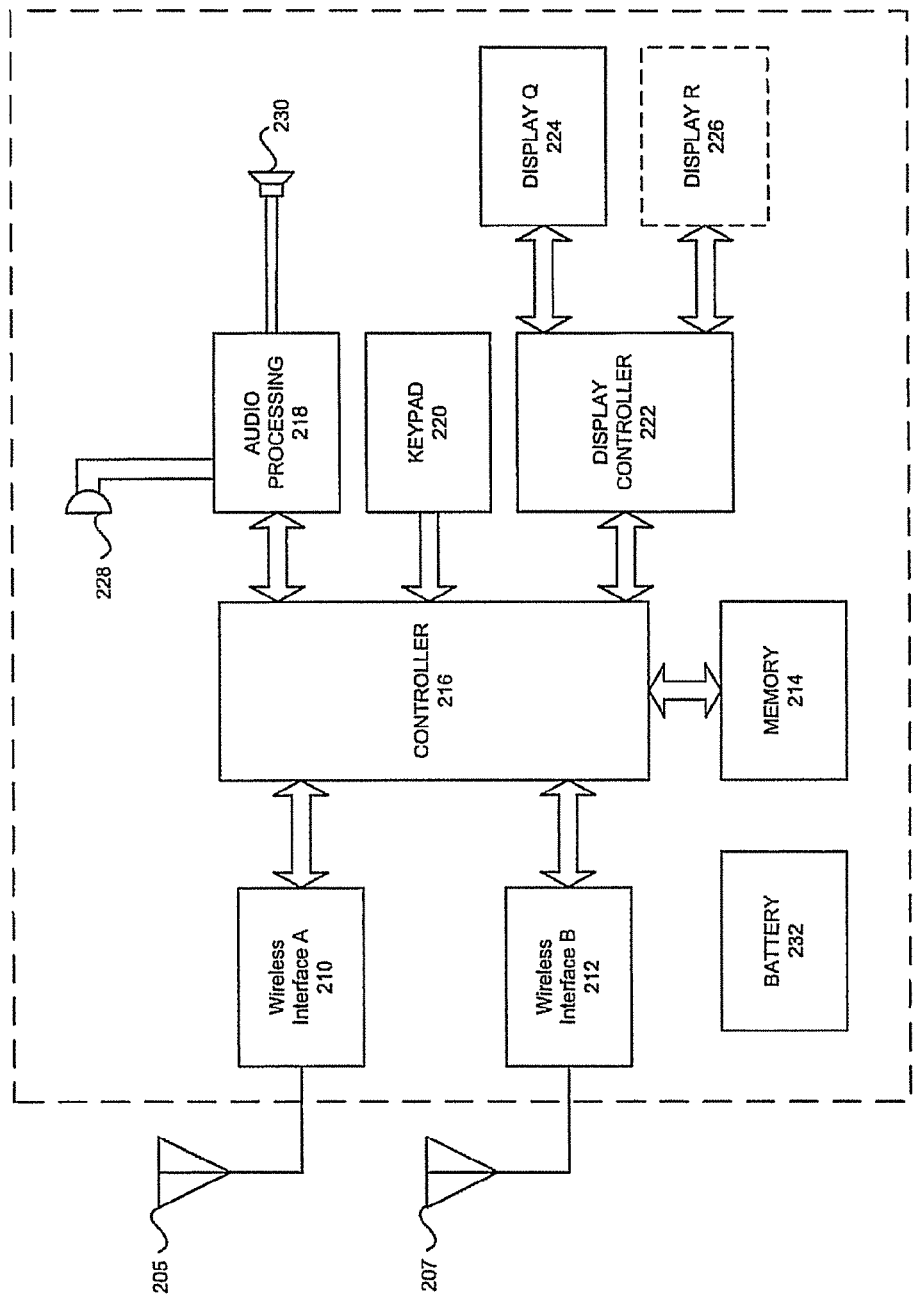
FIG. 2 is a block diagram of an exemplary access device supporting simultaneous wireless communication of multimedia information via two separate and distinct wireless communication networks, in accordance with a representative embodiment of the present invention.

FIG. 2 is a block diagram of an exemplary access device 200 supporting simultaneous wireless communication of multimedia information via two separate and distinct wireless communication networks, in accordance with a representative embodiment of the present invention. The access device 200 may correspond to, for example, the access device 122 shown in FIGS. 1A and 1B. As shown in FIG. 2, the access device 200 comprises a wireless interface A 210 and a wireless interface B 212 for simultaneous communication of multimedia information via wireless networks occupying separate and distinct portions of the radio frequency (RF) spectrum. The wireless interfaces A 210 and B 212 of FIG. 2 are communicatively coupled to a controller 216, that may employ memory 214 for storage of program instructions and/or data used during the operation of the access device 200. The controller 216 may access an audio processing circuit 218 that may be used to capture audio signals received from microphone 228, and to reproduce audio signals via speaker 230. Although FIG. 2 illustrates the capture and reproduction of a single channel of audio, multiple channels (e.g., stereo) may also be accommodated. Controller 216 may also receive user input via a keypad 220, and may provide visual output to a user via a display controller 222. In accordance with a representative embodiment of the present invention, the display controller 222 may exchange with the controller 216 displayable portions of the multimedia information received via the wireless interfaces A 210 and B 212, and parameters used for the management of the information to be displayed via the display devices Q 224 and R 226.

A representative embodiment of the present invention may also comprise additional wireless interfaces such as that illustrated in FIG. 2 by wireless interface C 211 with antenna 209. The wireless interface C 211 of FIG. 2 may correspond to, for example, the wireless interface of the access device 122 of FIG. 1B, that is used to support the wireless link 147. As was described above, a user of an access device such as the access device 200 of FIG. 2 may elect to direct multimedia content received via one or both of the wireless interfaces A 210 and B 212 to the wireless interface C 211, for display or playback on an external device such as a video display or entertainment system, as described above.

The access device 200 may operate from power provided by a battery 232, that may comprise either a primary or a rechargeable type of battery, enabling mobile handheld operation by a user. In a representative embodiment of the present invention, the controller 216 may monitor battery status, and may select from, or enable/disable use of one or more one or more wireless networks based upon current and/or anticipated power consumption during requested multimedia communication activity with the wireless networks.

The management of a battery resource may be impacted by the particular wireless interface standards selected for use. For example, some air interface standards employ bursty transmissions to mobile devices, thus permitting the receiving device to power down between transmissions and save battery power. In a representative embodiment of the present invention, when two or more available wireless networks are capable of supporting exchange of multimedia information with a particular content provider, the controller 216 may select the wireless network(s) to be used in order to provide the longest battery life while still meeting user service expectations. The user may enter such performance parameters via an input device such as, for example, the keypad 220 of FIG. 2.

The wireless interfaces A 210, B 212, and C 211 of FIG. 2 may operate to transmit and/or receive digital information in a number of RF frequency bands, and may be configurable to be compatible with any of a wide variety of wireless personal area, local area, metropolitan area, and wide area network standards such as, for example, the Institute of Electrical and Electronic Engineers (IEEE) 802.11a/b/g/n, IEEE 802.15.3a, IEEE 802.16 (WiMAX), EIA/TIA IS-95, CMDA 2000 1xEV DO/DV, Wideband CDMA (WCDMA), EIA/TIA IS-136, Global System for Mobile Communications (GSM), Enhanced Data Rates for GSM Evolution (EDGE), General Packet Radio Services (GPRS), paging network, European Telecommunications Standards Institute (ETSI) HIPERACCESS and HIPERMAN, local multipoint distribution service (LMDS), and Digital Video Broadcast-Handheld (DVB-H) specifications. Although the illustration of FIG. 2 shows circuitry supporting separate antennas 205, 207, 209 connected to the wireless interfaces A 210, B 212, and C 211, respectively, the wireless interfaces A 210, B 212, and C 211 of a representative embodiment of the present invention may be configured to transmit and receive via a common antenna arrangement, depending upon the nature of the RF signals employed.

In a representative embodiment of the present invention, the controller 216 may be responsible for handling the details of the wireless networks protocols used for receiving and transmitting data via the wireless networks supported by the wireless interface A 210, B 212, and C 211. Firmware and/or software stored in memory 214 may enable the controller 216 to process and respond to air interface messaging used by the wireless networks of wireless interfaces A 210, B 212, and C 211. The controller 216 may therefore handle aspects of air interface messaging for establishment and management of exchanges of data (e.g., multimedia information) and control messaging via the wireless interfaces A 210, B 212, C 211. The controller 216 of a representative embodiment of the present invention may comprise any of a number of current or future microprocessors including, for example, a suitable stand-alone microprocessor selected from those offered by Intel Corporation, Motorola, Hitachi, and many other suppliers, or may comprise a microprocessor core that is part of a highly functional integrated circuit device such as, for example, processor cores by ARM Ltd. or MIPS Technologies, Inc., for example.

In some representative embodiments of the present invention, the memory 214 may be part of the controller 216. The audio processing 218 and/or the display controller 222 may also be integrated within the same device as the controller 216, resulting in a high-functionality, cost-effective solution that significantly reduces the space and the interconnects needed for the circuitry of the access device 222. The memory 214 may comprise any of a number of forms of volatile and non-volatile memory such as, for example, static or dynamic RAM, ROM, EPROM, NAND and NOR flash memory, and hard disk, to name only a few.

In one representative embodiment of the present invention, the controller 216 may perform some or all of the encoding and decoding of audio involved in the operation of the access device 200, and audio processing circuit 218 may perform analog-to-digital and digital-to-analog conversion of digitized audio. In other representative embodiments, the controller 216 may exchange digitally encoded audio with the audio processing circuit 218. In that instance, the audio processing circuit 218 may perform the encoding and decoding of digital audio information. Audio processing by the audio processing circuit 218 or the controller 216 may support encoding and decoding according to any of a number of formats including, for example, Windows Media Audio (WMA), MPEG-1 layer 3 (MP3), Ogg Vorbis, MPEG-2 Advanced Audio Coding (AAC), and/or any of a number of other formats. In some representative embodiments of the present invention, digitally encoded audio exchanged via the wireless interfaces A 201 and B 212 may be processed by the controller 216, to enable the audio information to be shared via the wireless interface C 211, for example.

In a representative embodiment of the present invention, the display controller 222 may be capable of the processing required for the decoding and display of still and motion images that are contained in the multimedia information that is exchanged via the wireless interfaces A 210 and B 212. The display controller 222 may process compressed digital images and motion video encoded using, for example, one or more of the Joint Photographic Experts Group (JPEG) or Motion Picture Experts Group (MPEG) (e.g., MPEG-2, MPEG-4) standards. For example, the display controller 222 may be capable of receiving and processing a number of individual MPEG-2 or MPEG-4 data streams received via the wireless interfaces A 210 and B 212. The resulting images may be shown in separate display regions of the displays Q 224 and/or R 226. A display controller such as, for example, the display controller 222 may be capable of supporting the creation and management of multiple display regions located on multiple display devices of an access device such as the access device 122 of FIG. 1B, for example. In some representative embodiments of the present invention, the display controller 222 may cooperate with the controller 216 in processing compressed digital images and motion video that is exchanged with external devices via the wireless interface C 211, as described above with respect to FIGS. 1B and 2. Such processing may include, for example, compression/decompression, interpolation/decimation, and windowing, to name just a few processing functions.

The operating parameters, status, and control information used to manage the display controller 222, along with the multimedia information for display on the displays Q 224 and R 226, and external devices linked via the wireless interface C 211, may be passed between the display controller 222 by the controller 216 using a microprocessor bus arrangement such as those employed by the microprocessors discussed above. The operating parameters and control information may be representative of user inputs related to, for example, the creation, resizing, relocation, and priority (e.g., visibility) of the display regions associated with each of the multimedia activities of a user.

A representative embodiment of the present invention may comprise a user input device such as, for example, the keypad 220 that may comprise a conventional keypad for the entry of numeric or alphanumeric information by a user. In other representative embodiments of the present invention, the user input device may comprise a touch sensitive overlay on the displays Q 224 and/or R 226, a scroll wheel, a track ball, and a joy stick, for example. In any case, a manual input device such as, for example, the keypad 220 of FIG. 2 may be employed by as a user input device for selection of parameters, options, and services, and/or input of application information by a user. User input devices may also be linked to the access device 200 via the wireless interface 211, for example. External devices such as, for example, a keyboard, a mouse, a trackball, an optical scanner, a video camera, and other like devices may communicate with the access device 200 via a wireless protocol over the wireless interface 211.

For example, a user may desire that a window containing certain types of information to be made visible when an update to that information is received. For example, an access device such as access device 122 that has a wireless interface supporting a paging service may upon receiving a page, for example, reveal a window containing information about the calling party. The placement, color, size, and length of time displayed may, for example, be user configurable, and may even depend upon the identity of the party performing the page.

Figure 3:
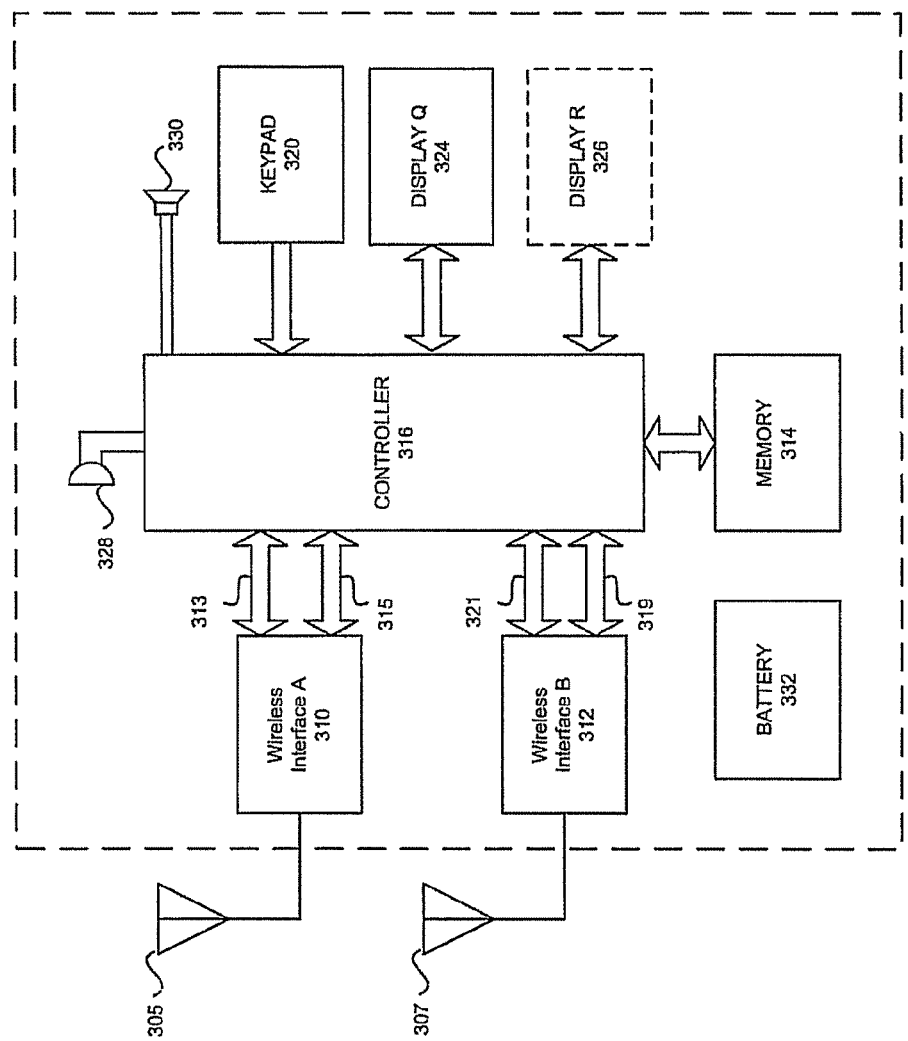
FIG. 3 shows a block diagram of another exemplary access device in which the functionality of the audio processing circuit and the display controller of FIG. 2 have been integrated with the controller of FIG. 2 to form the controller, in accordance with a representative embodiment of the present invention.

FIG. 3 shows a block diagram of another exemplary access device 300 in which the functionality of the audio processing circuit 218 and the display controller 222 of FIG. 2 have been integrated with the controller 216 of FIG. 2 to form the controller 316, in accordance with a representative embodiment of the present invention. In the illustration of FIG. 3, the wireless interfaces A 310 and B 312, the battery 332, the memory 314, the microphone 328, the speaker 330, the keypad 320 and the displays Q 324 and R 326 may correspond to, for example, the wireless interfaces A 210 and B 212, the battery 232, the memory 214, the microphone 228, the speaker 230, the keypad 220 and the displays Q 224 and R 226, respectively. Although a wireless interface such as the wireless interface C 211 of FIG. 2 has been omitted from FIG. 3, this is only for reasons of clarity, as additional wireless interfaces may also be employed in the access device 300, to interface with external devices such as those described above. The high level of integration of the controller 316 in the access device 300 of FIG. 3 permits additional reductions in the area and in the number of circuit interconnects of the circuit boards in the access device 300.

Figure 4:
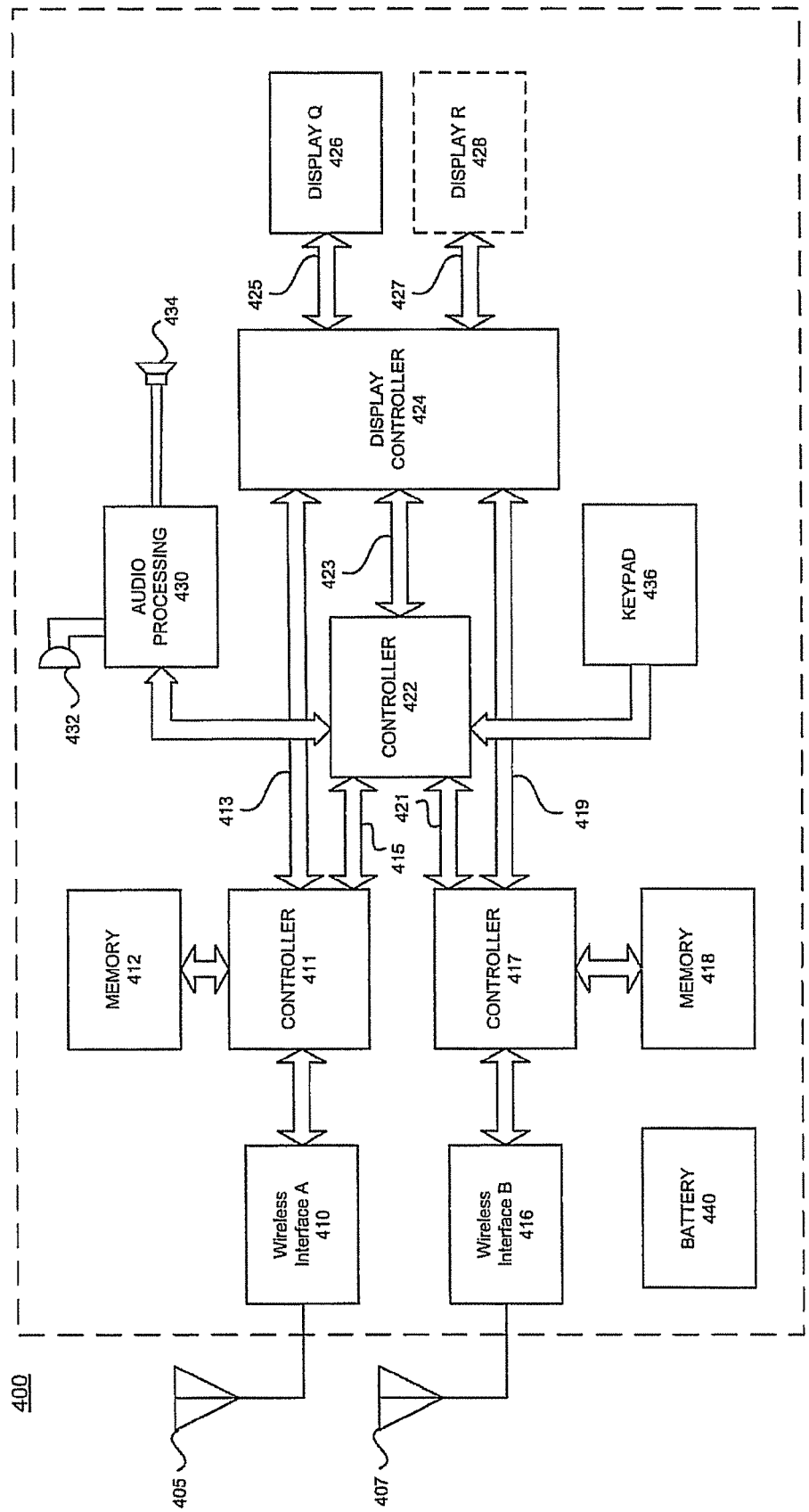
FIG. 4 shows a block diagram of another exemplary access device in which dedicated controllers A and B process the air interface protocols supported by the wireless interfaces A and B, respectively, in accordance with a representative embodiment of the present invention.

FIG. 4 shows a block diagram of another exemplary access device 400 in which dedicated controllers A 411 and B 417 process the air interface protocols supported by the wireless interfaces A 410 and B 416, respectively, in accordance with a representative embodiment of the present invention. In the illustration of FIG. 4, the processing of the wireless network protocols and physical wireless interfaces of the wireless interfaces A 410 and B 412 have been moved into separate controllers 411 and 417, respectively. Each of the controllers 411, 417 are operably coupled to memories 412, 418, respectively, that may be used for the storage of program code and data. The controllers 411, 417 may pass a portion of the streams of multimedia information to a display controller 424 via the communications paths 413, 419, for display on one or both of displays Q 426 and R 428. Some multimedia information may also be exchanged with external devices using additional wireless interfaces (not shown) such as the wireless interface 211 illustrated in FIG. 2, for example. The battery 440, the microphone 432, the speaker 434, the keypad 436 and the displays Q 426 and R 428 may correspond to, for example, the battery 232, the microphone 228, the speaker 230, the keypad 220 and the displays Q 224 and R 226 of FIG. 2, respectively.

Figure 5:
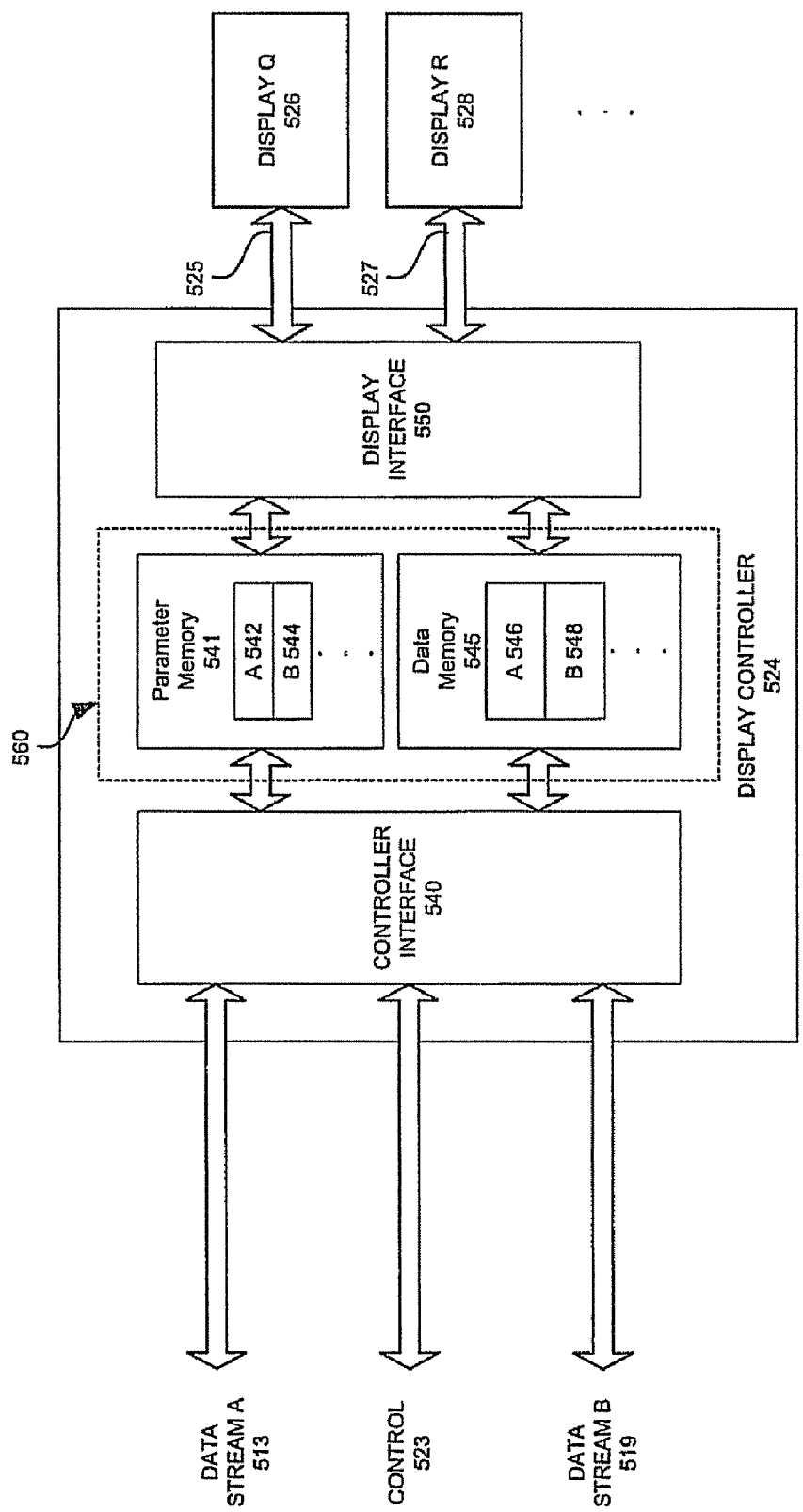
FIG. 5 shows a block diagram of an exemplary display controller for use in supporting the consumption of multimedia information exchanged via multiple, independent wireless networks, in accordance with a representative embodiment of the present invention.

FIG. 5 shows a block diagram of an exemplary display controller 524 for use in supporting the consumption of multimedia information exchanged via multiple, independent wireless networks, in accordance with a representative embodiment of the present invention. The display controller 524 may correspond to, for example, the display controller 424 of FIG. 4. As shown in FIG. 5, the display controller 524 comprises a controller interface 540, a memory 560 containing a parameter memory 541 and a data memory 545, and a display interface 550. The controller interface 540 shown in the example of FIG. 2 supports an interface for a data stream A 513 that may correspond to, for example, the data stream 413 of FIG. 4, and an interface for a data stream B 519 that may correspond to, for example, the data stream 419 of FIG. 4. The controller interface 540 of the display controller 524 also supports a control interface 523 that may correspond to, for example, the control interface 423 of FIG. 4. Although the illustration of FIG. 5 shows only two displays Q 526 and R 528, this does not represent a specific limitation of the present invention. As described above, in some representative embodiments of the present invention, the display controller 524 may cooperate with a controller such as, for example, the controller 216 of FIG. 2, or the controller 422 of FIG. 4, to pass multimedia information exchanged via multiple independent communication paths (e.g., the communication paths 145*a/b/c* and 146*a/b/c* of FIG. 1B) to/from external devices such as, for example, video monitors, large screen and projection video equipment via a wireless interface similar to the wireless interface 211 of FIG. 2, for example. Representative embodiments of the present invention may employ a greater or lesser number of displays, without departing from the spirit and scope of the present invention.

A representative embodiment of the present invention may employ the parameter memory 541, for storing parameter values related to the operation of the display controller 524. For example, parameters representing the display to be used, and the location, size, visibility, and memory address for a particular display region of the display being employed such as, for example, the displays Q 526 and R 528, may be stored in the parameter memory of a representative embodiment of the present invention. Parameters for managing display of the data streams received from each of the wireless networks supported by an access device may be stored in individual parameter memory portions within a parameter memory such as, for example, the parameter memory 541. This is illustrated by the parameter memory portions A 542 and B 544, that may correspond to parameters used in the management of display regions for data streams A 513 and B 519, for example. Similarly, a representative embodiment of the present invention may employ the data memory 545, for storing data to be displayed by the display controller 524. The data memory 545 may, for example, store MPEG-2 encoded data before and/or after decoding, to enable the display of the data by the displays Q 526 and R 528. In a representative embodiment of the present invention, a separate area of the data memory portion 545 may be assigned for each data stream currently assigned a display region. For instance, the data memory portions A 546 and B 548 in the data memory 545 may correspond to, for example, data received from the data stream A 513 and data stream B 519 of FIG. 5, respectively. It should be noted that although the illustration of FIG. 5 shows the parameter memory 541 and data memory 545 located within the display controller 524, a representative embodiment of the present invention is not specifically limited in this regard, and may utilize external memory by employing an external memory interface (not shown) for connecting additional memory devices (not shown) to the display controller 524. This may be desirable when the amount of parameter and data memory required to support the available wireless networks is larger than that present in a display controller such as, for example, the display controller 524. In addition, it should be noted that although the previous discussion and the illustration of FIG. 5 shows the parameter memory portion A 542 as contained within a close region of parameter memory 541, the parameters for a given display region may be located at various, non-adjacent locations in the parameter memory 541.

In a representative embodiment of the present invention, a display interface such as, for example, the display interface 550 may access information stored in a data memory such as the data memory 545 of FIG. 5, and generate appropriate electrical signals to produce a corresponding visual display on operably-coupled display devices such as, for example, the displays Q 526 and R 528. In one representative embodiment of the present invention, the display interface 550 may access data and parameters stored in data memory 545 and parameter memory 541, and may decode the data to produce signals for producing an image on one or both of the displays Q 526 and R 528, corresponding to the contents of data memory 545 and parameter memory 541. For example, the display interface 550 may process parameters stored in the parameter memory portion A 542, and data stored in the data memory portion 546 to produce an appropriate visual image on the display Q 526 corresponding to the data received in data stream A 513. In a similar fashion, the display interface 550 may process parameters stored in the parameter memory portion B 544, and data stored in the data memory portion B 548 to produce an appropriate visual image on the display Q 526 corresponding to the data received in data stream B 519.

Figure 6:
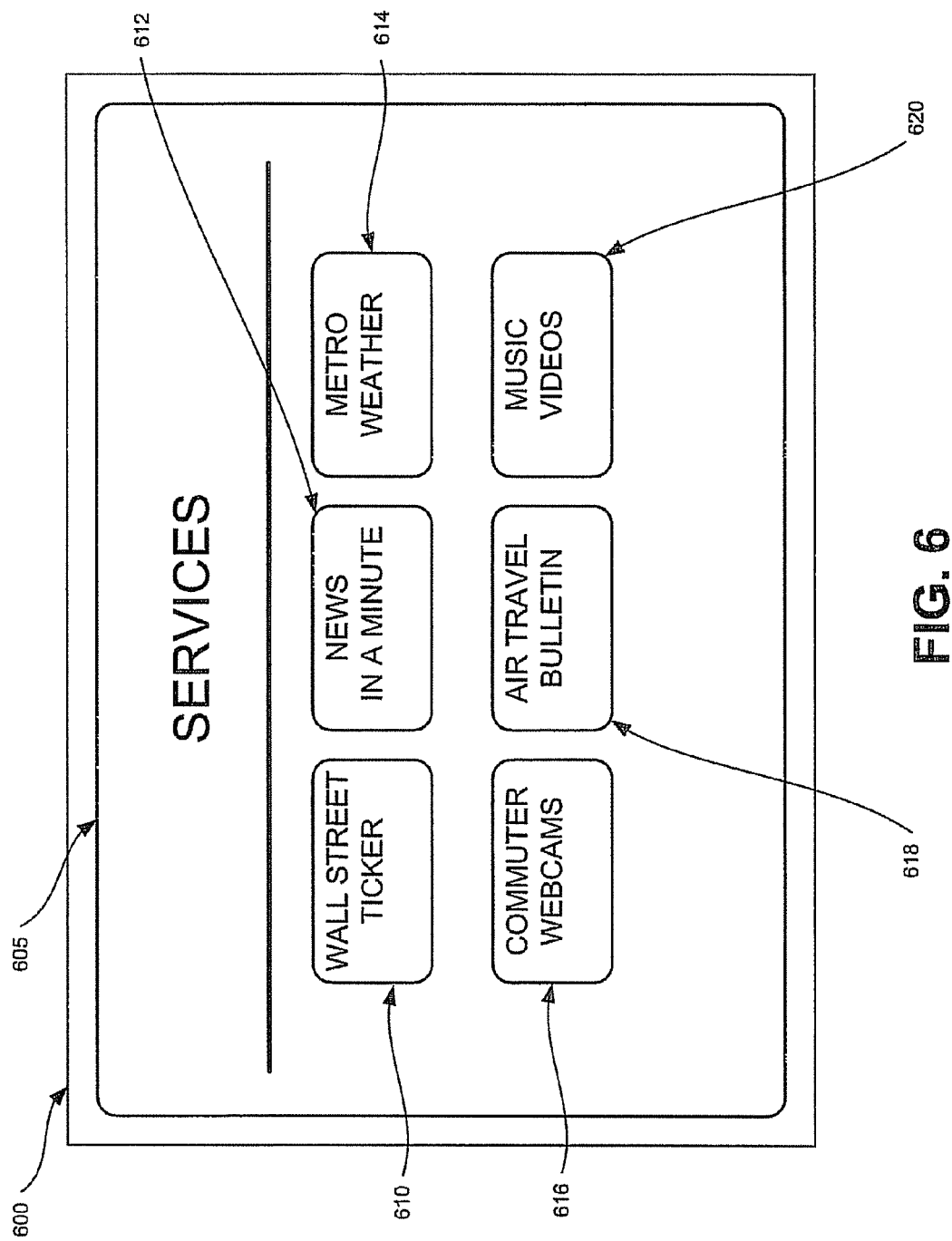
FIG. 6 is an illustration of a display of an access device that may correspond to, for example, the access device of FIG. 1B, showing a services screen comprising a collection of icons representing multimedia information services that may be simultaneously accessed using an assortment of independent wireless networks, in accordance with a representative embodiment of the present invention.

FIG. 6 is an illustration of a display 600 of an access device that may correspond to, for example, the access device 122 of FIG. 1B, showing a services screen 605 comprising a collection of icons representing multimedia information sources that may be simultaneously accessed using an assortment of independent wireless networks, in accordance with a representative embodiment of the present invention. The collection of icons comprises a "Wall Street Ticker" icon 610, a "News in a Minute" icon 612, a "Metro Weather" icon 614, a "Commuter Webcams" icon 616, an "Air Travel Bulletin" icon 618, and a "Music Videos" icon 620. Each of the icons 610, 612, 614, 616, 618, 620 may, upon selection by a user, activate application firmware and/or software in the access device 122, that configures the access device 122 to support the exchange of multimedia information with the respective source using a portion of a display such as the display 600 of FIG. 6. For example, when selected, the "Wall Street Ticker" icon 610 may activate application firmware and/or software that identifies a wireless network supporting the "Wall Street Ticker" service, may determine whether a wireless interface is available on the access device 122 with which the service may be accessed, and may create a stock ticker display region on one of the displays of the access device 122. Upon receiving stock trading information, the access device may show a continuously updated sequence of stock trades on selected trading exchanges. Before or at the time the user selects the "Wall Street Ticker" service, the user may be permitted to indicate on which display the stock ticker will appear (e.g., if the access device 122 has more than one display), the location and the size of display region used for the stock ticker, and when the stock ticker display will be visible (e.g., during the local time of the exchange trading day.) This particular service may, for example, be offered in a text-only form, and may require minimum bandwidth. The "Wall Street Ticker" service may therefore be able to be supported by a wireless network supporting a limited data rate such as, for example, the short message service (SMS) offered by many cellular service providers. Others of the services represented by the icons of FIG. 6 may also be able to be supported via a communication network service having a lower data rate including, for example, the "Metro Weather" service of icon 614, and the "Air Travel Bulletin" service of icon 618.

In contrast, some services supported by an access device such as, for example, the access device 122 of FIG. 1B may require higher data rates to perform satisfactorily. For example, the "New In A Minute" service represented by icon 612, the "Commuter Webcams" service represented by icon 616, and the "Music Videos" service represented by icon 620 may only be presented in a satisfactory way via higher bandwidth connection to the access device 122. Examples of some wireless network air interface technologies that may be employed for services that require higher bandwidth include, for example, those compliant with the IEEE 802.11a/b/g/n, IEEE 802.15.3a ultra-wideband, IEEE 802.16 (WiMAX), and DVB-H standards. Certain information service offerings may only be available via certain wireless networks due to, for example, bandwidth limitations or licensing agreements. A user wishing to access such services may find it advantageous to be able to simultaneously communicate via multiple wireless communication networks.

The complement of multimedia information sources available to the user of the access device may be determined based upon the availability of access to the networks used to support them. For example, in one representative embodiment of the present invention, the "News in a Minute" icon 612 shown in FIG. 6 may only be presented to a user (e.g., able to be selected) when DVB-H service has been determined to be available. In another representative embodiment of the present invention, the "News in a Minute" icon 612 shown in FIG. 6 may only be presented to a user (e.g., able to be selected) when a wireless network with sufficient bandwidth to support the exchange of multimedia information has been determined to be available.

Upon user selection of one of the icons 610, 612, 614, 616, 618, 620 representing a multimedia information source, an access device in accordance with a representative embodiment of the present invention may determine whether access to a wireless network with sufficient bandwidth is available. This may involve a determination of whether a wireless interface compatible with a wireless network having sufficient bandwidth is available for use, and whether the corresponding network is also available at the user's current location. If wireless network capacity is available to the access device, the access device may then activate a display region for use in accessing the service, and may establish a connection to the selected service. The user may use elements of the graphical interface to position and size the display region, and to set parameters that define the priority of the display region in relation to others currently active.

In a representative embodiment of the present invention, the controller 216 may coordinate the use of the wireless interfaces A 210 and B 212, in order to minimize interference between the wireless interfaces A 210 and B 212, while observing the respective air interface protocols.

Figure 7:
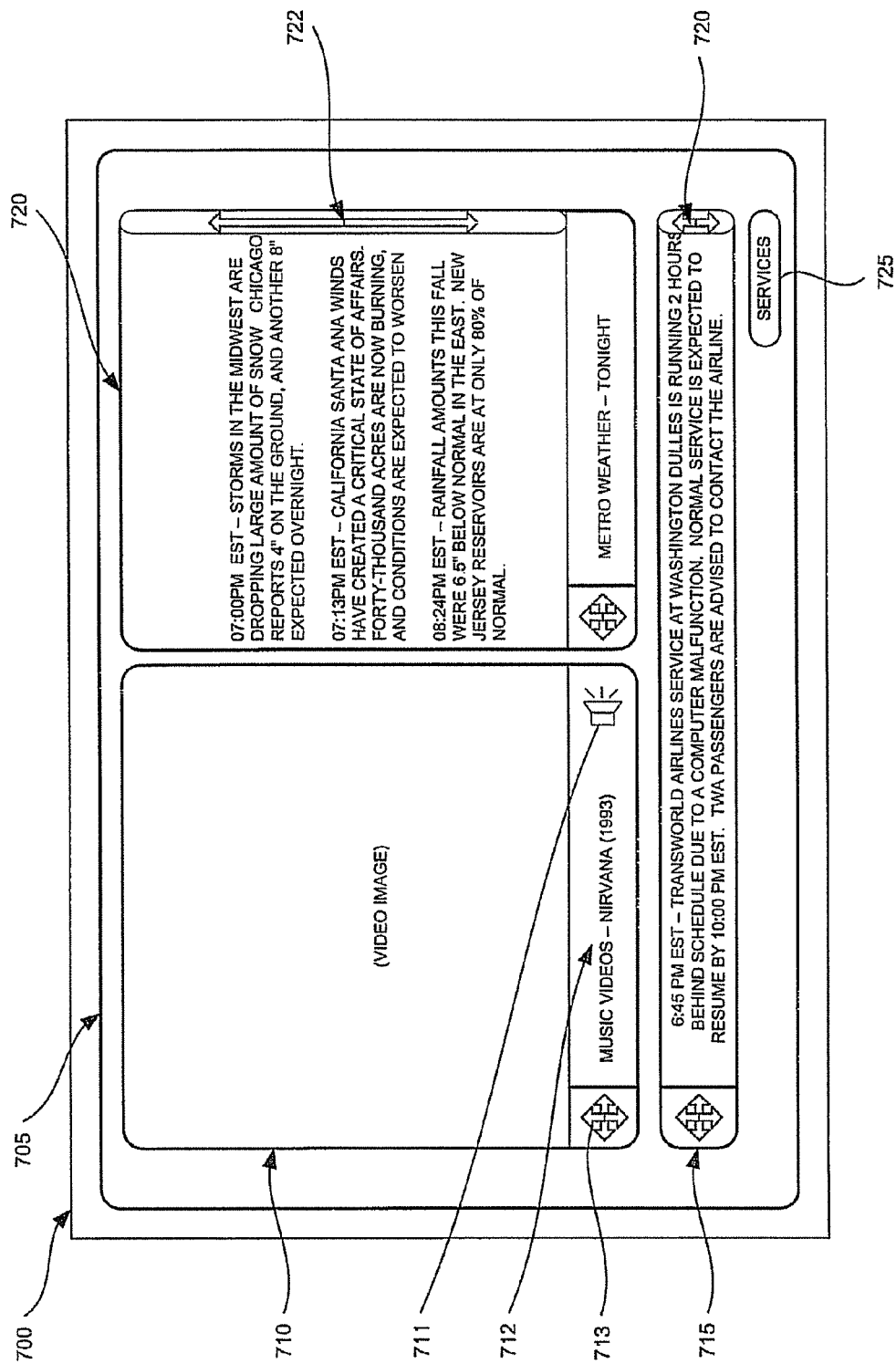
FIG. 7 is an illustration of a display of an access device that may correspond to, for example, the access device of FIG. 1B, showing a screen having an arrangement of display regions for consuming independent streams of multimedia information from multiple wireless networks, in accordance with a representative embodiment of the present invention.

FIG. 7 is an illustration of a display 700 of an access device that may correspond to, for example, the access device 122 of FIG. 1B, showing a screen 705 having an arrangement of display regions 710, 715, 720 for consuming independent streams of multimedia information from multiple wireless networks, in accordance with a representative embodiment of the present invention. In the example of FIG. 7, a user of an access device such as, for example, the access device 122 of FIG. 1B has activated three services: the "Music Videos" service represented by icon 620, the "Metro Weather" service represented by icon 614, and the "Air Travel Bulletin" service represented by icon 618, of FIG. 6.

In a representative embodiment of the present invention, activation of the "Music Videos" service activated via icon 620 of FIG. 6 may result in the creation of the display region 710 shown in FIG. 7. The display region 720 comprises a window management icon 713, that may be used to move and/or resize the display region 710. The sound state icon 711 may be used to indicate which of the display regions on the screen 705 is currently enabled to reproduce audio content via a speaker and/or headphones connected to the access device 122, for example. The stream identifier area 712 identifies the information stream that is currently active in the display region 710 (e.g., "Music Videos"), and may include additional details about the content (e.g., "Nirvana (1993)".

The illustration of FIG. 7 also shows a second display region 715 that may result from the activation of the "Air Travel Bulletin" service represented by the icon 614 of FIG. 6, for example. This display region is also equipped with a window management icon, and a scroll tool 717 to enable the textual material in the display region to be scrolled vertically, to enable access to a buffer of textual information that has been received.

In addition, the illustration of FIG. 7 includes a third display region 720 for the display of information from the "Metro Weather" service represented in FIG. 6 by the icon 614. The display region 720 shows a series of textual weather news items. In this example, a scroll tool 722 is provided to allow the user of the access device 122 to move up and down in the weather news items. Because the content of the display region 720 is textual information, this information service is likely to be accessible using a lower bandwidth wireless communication path.

Although the user of the access device displaying the display 700 has positioned the display regions 710, 715, and 720 such that the entirety of each of the display regions is shown and does not overlap other display regions, this does not represent a specific limitation of the present invention. Any of the display regions of a display such as, for example, the display 700 of a representative embodiment of the present invention may overlap any other display region, and may be arranged in that manner whether particular display regions are enabled to be in a visible or hidden state. In a representative embodiment of the present invention, a display region may be hidden, for example, if a user-defined period of time passes since the last update of content. In addition, the user of a representative embodiment of the present invention may elect to display any of the display elements or regions shown in the illustrations of FIGS. 6 and 7, and/or to direct playback of other forms of multimedia content such as audio materials, on an external device via a wireless link, as described above with respect to FIGS. 1B, 2, 3, 4, and 5.

Figure 8:
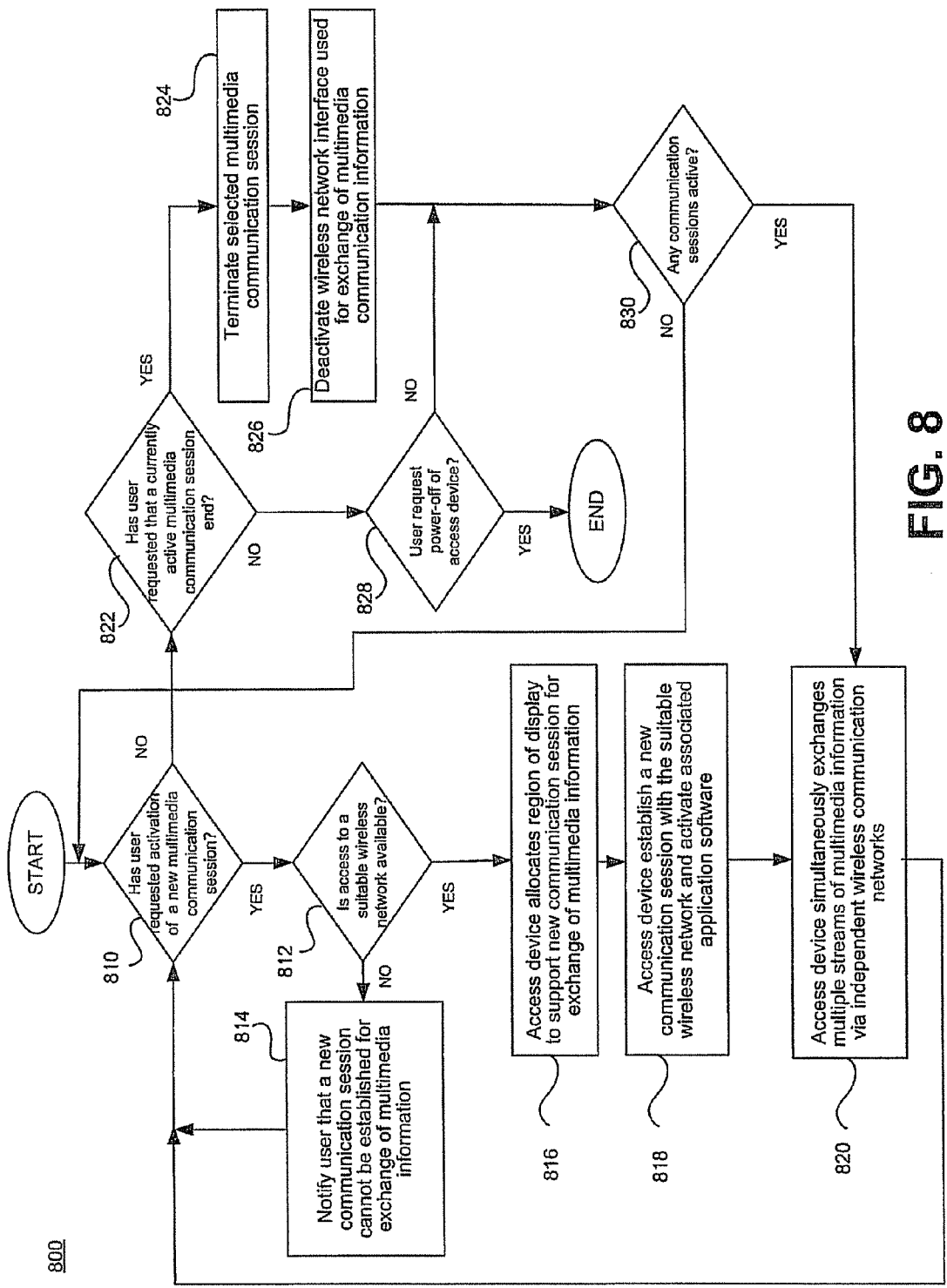
FIG. 8 is a flowchart of an exemplary method of operating an access device such as, for example, the access device 122 of FIG. 1B supporting simultaneous the exchange of multimedia information via multiple, simultaneous communication sessions via independent wireless networks, in accordance with a representative embodiment of the present invention.

FIG. 8 is a flowchart of an exemplary method of operating an access device such as, for example, the access device 122 of FIG. 1B supporting simultaneous the exchange of multimedia information via multiple, simultaneous communication sessions via independent wireless networks, in accordance with a representative embodiment of the present invention. To more clearly illustrate the actions that may be involved, the following discussion of the flowchart of FIG. 8 makes reference to the elements of FIGS. 1B, 2 and 6. The method of FIG. 8 begins following power-up of an access device such as, for example, the access device 122 of FIG. 1B. At some time after the access device 122 becomes operational, the access device may determine whether the user has requested activation of a new multimedia communication session (block 810). The user may initiate communication by selecting one of the icons 610, 612, 614, 66, 618, 620 show in FIG. 6, for example. If it is determined that the user has requested activation of a new multimedia communication session, a determination may then be made whether access to a suitable wireless network is available (block 812). This may involve a determination of the data rate requirements of the multimedia information to be exchanged during the requested communication session, the availability of a wireless interface capable of supporting communication at the required data rate, and whether wireless network service at that data rate is currently available. If suitable wireless service cannot be supported, the access device 122 may notify the user that a suitable wireless network is not currently available to support the exchange of multimedia information for the requested communication session (block 814). This notification may be in the form of, for example, a text or graphic on a display device on the access device 122, or via audio tone or speech alerts.

If, however, access to a suitable wireless network is available (block 812), the access device 122 may allocate a region of a display such as, for example, the display 700 of FIG. 7 for use in supporting a new communication session for the exchange of multimedia information (block 816). The access device 122 may also establish a new communications session via the suitable wireless network, and may activate associated application software (block 818). The end user may then begin exchange of multimedia information, simultaneous with the exchange of other streams of multimedia information via other, independent wireless communication networks (block 820).

If, at block 810, a user does not request activation of a new multimedia communication session, the access device may determine whether the user has requested that a currently active multimedia communication session end (block 822). If it is determined that the user has requested that a currently active multimedia communication session end, the access device may terminate the selected communication session (block 824), and may deactivate the wireless network interface used for exchange of multimedia information (block 826). A check may then be made whether any communication sessions remain active (block 830). If communication sessions continue to be active on the access device (e.g., the access device 122), the user may continue the simultaneous exchange of multimedia information via the independent wireless communication networks currently still in use (block 820). If no communication sessions remain active, the method of FIG. 8 may loop, to once again determine whether the user has requested activation of a new multimedia communication session (block 810).

If, at block 822, the access device determines that the user did not request that a currently active multimedia communication session end, a determination may be made whether the user has powered the access device off (block 828). If the user has not requested that the access device be powered off, the method of FIG. 8 may proceed as described above to determine whether any communication sessions remain active (block 830). If it is determined that the user has requested that the access device be powered off, the method of FIG. 8 ends.

Aspects of the present invention may be found in a communication device for the exchange of multimedia information. Such a device may comprise two or more wireless communication interfaces, where each interface may communicate separate streams of multimedia information via independent radio frequency communication networks. The device may also comprise at least one visual display device for the display of text and images, and a controller adapted to establish and maintain communication via the radio frequency communication networks. The device may comprise memory for storing data and program code accessible by the controller. In a representative embodiment of the present invention, the program code may support consumption of each of the streams of multimedia information within associated user-defined regions of the at least one visual display.

In some representative embodiments of the present invention, the wireless communication interfaces may be compatible with a wireless wide area network protocol, where the wireless wide area network protocol may comprise one of the following: a code divisional multiple access (CDMA) cellular protocol, a time division multiple access (TDMA) cellular protocol, an Institute of Electrical and Electronics Engineers (IEEE)802.16 protocol, and a Digital Video Broadcast-Handhelds (DVB-H) protocol. In other representative embodiments of the present invention, the wireless local area network protocol may comprise one of the following: an Institute of Electrical and Electronics Engineers (IEEE) 802.11 protocol, an IEEE 802.15.3a protocol, and a Bluetooth compatible protocol.

In a representative embodiment of the present invention, the at least one visual display may comprise two visual displays. The controller may adjust at least one transmit interval of the two or more wireless communication interfaces to minimize interference between the radio frequency communication networks. The two or more wireless communication interfaces may be configurable to operate, at any point in time, using any one of two or more incompatible wireless network protocols. A representative embodiment of the present invention may also comprise a display controller operably coupled to the at least one visual display, wherein the display controller employs parameters defining user-defined display regions. In addition, a representative embodiment of the present invention may comprise a user input device for activating the exchange of streams of multimedia information via independent radio frequency communication networks. Multimedia information may comprise at least one of the following: streaming video, broadcast video, digitized audio, a digitized still image, and text.

Additional aspects of the present invention may be seen in a machine-readable storage, having stored thereon a computer program having a plurality of code sections for operating a handheld communication device supporting simultaneous exchange of separate streams of multimedia information via at least two radio frequency communication networks. The code sections may be executable by a machine for causing the machine to perform the operations comprising establishing a first communication session using a first of the at least two radio frequency communication networks, and associating a first user-definable display region with the first communication session. The operations may also comprise establishing a second communication session, concurrent with the first communication session, using a second of the at least two radio frequency communication networks, and associating a second user-definable display region with the second communication session. The operations may include simultaneously exchanging multimedia information using the first and second user-definable display regions, via the first and second communication networks, respectively.

In a representative embodiment of the present invention, establishing a communication session may comprise determining a bandwidth requirement for exchange of multimedia information, selecting a wireless network based upon the bandwidth requirement, and exchanging messaging via the selected wireless network to establish the communication session. Selecting a wireless network may comprise i) identifying a wireless network that supports the bandwidth requirement, and that is supported by the code sections for operating the handheld communication device, and ii) determining whether sufficient battery power remains to permit operation of the handheld communication device on the identified network. Selecting a wireless network may also comprise iii) employing the identified wireless network, if remaining battery power is sufficient to permit operation of the handheld communication device on the identified network, and iv) repeating (i) through (iii) if remaining battery power is not sufficient to permit operation of the handheld communication device on the identified network. A representative embodiment of the present invention may v) notify a user, if remaining battery power is not sufficient to permit operation of the handheld communication device on any wireless network supported by the code sections for operating the handheld communication device.

In a representative embodiment in accordance with the present invention, associating a user-definable display region with a communication session may comprise allocating a region of a display device, and setting parameters to cause a display, within the allocated region of the display device, of at least a portion of multimedia information exchanged during the communication session. In various representative embodiments of the present invention, multimedia information may comprise at least one of the following: streaming video, broadcast video, digitized audio, a digitized still image, and text. One of the radio frequency communication networks may operate according to one of the following: a code divisional multiple access (CDMA) cellular protocol, a time division multiple access (TDMA) cellular protocol, an Institute of Electrical and Electronics Engineers (IEEE) 802.16 protocol, and a Digital Video Broadcast-Handhelds (DVB-H) protocol. One of the radio frequency communication networks may also operate according to one of the following: an Institute of Electrical and Electronics Engineers (IEEE) 802.11 protocol, an IEEE 802.15.3a protocol, and a Bluetooth compatible protocol.

Yet other aspects of the present invention may be observed in a system supporting simultaneous exchange of separate streams of multimedia information via a plurality of independent radio frequency communication networks. Such a system may comprise at least one handheld communication device having circuitry for transmitting and receiving multimedia information via the plurality of radio frequency communication networks. The at least one handheld communication device may comprise at least one visual display for presenting user-definable display regions. Each display region may be associated with the exchange of multimedia information via one of the plurality of radio frequency communication networks. The at least one handheld communication device may support user establishment of simultaneous exchange of independent streams of multimedia information between the at least one handheld device and at least two of the plurality of radio frequency communication networks.

In various representative embodiments of the present invention, multimedia information may comprise at least one of the following: streaming video, broadcast video, digitized audio, a digitized still image, and text. Each of the at least one handheld communication device may select from the plurality of radio frequency communication networks based upon a bandwidth requirement for communication of multimedia information, and the selection may be based upon a capacity of a battery used for operation of the at least one handheld communication device. The at least one visual display may comprise two display devices, and wherein each display device is functional to display images and text, and at least one of the following: the display region size, the display region location, and the conditions under which the display region is visible, may be determined using input from a user of the handheld communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication device for the exchange of multimedia information, the device comprising:
   two or more wireless communication interfaces, wherein each interface communicates separate streams of multimedia information via independent radio frequency communication networks;
   at least one visual display device for the display of text and images;
   a controller adapted to establish and maintain communication via the radio frequency communication networks;
   memory for storing data and program code accessible by the controller; and
   wherein the program code supports consumption of each of the streams of multimedia information within associated user-defined regions of the at least one visual display.

2. The communication device according to claim 1 wherein the wireless communication interfaces comprise respective communication interfaces, each respective wireless communication interface being are compatible with a respective wireless wide area network protocol.

3. The communication device according to claim 2 wherein each respective wireless communication interface comprises a wireless communication interface compatible with at least one of
   a code divisional multiple access (CDMA) cellular protocol,
   a time division multiple access (TDMA) cellular protocol,
   an Institute of Electrical and Electronics Engineers (IEEE) 802.16 protocol, and
   a Digital Video Broadcast-Handhelds (DVB-H) protocol.

4. The communication device according to claim 3 wherein at least one respective wireless communication interface comprises a wireless communication interface compatible with a wireless local area network protocol.

5. The communication device according to claim 4 wherein the wireless local area network protocol comprises one of
- an Institute of Electrical and Electronics Engineers (IEEE) 802.11 protocol,
- an IEEE 802.15.3 a protocol, and
- a Bluetooth compatible protocol.

6. The communication device according to claim 1 wherein each respective wireless communication interface of the two or more wireless communication interfaces is configurable to operate using a like number of respective incompatible wireless network protocols.

7. The communication device according to claim 1 further comprising:
- a display controller operably coupled to the at least one visual display device, wherein the display controller operates in response to parameters defining user-defined display regions.

8. The communication device according to claim 1 wherein the at least one visual display device comprises a first visual display and a second visual display.

9. A method for a handheld communication device the method comprising:
- at the handheld communication device, establishing a first communication session using a first radio frequency communication network;
- associating a first user-definable display region of a display device of the handheld communication device with the first communication session;
- establishing a second communication session using a second radio frequency communication network;
- associating a second user-definable display region of a display device of the handheld communication device with the second communication session; and
- communicating multimedia information using the first user-definable display region and the second user-definable display region, via the first and second communication networks, respectively.

10. The method of claim 9 wherein establishing a communication session comprises:
- determining a bandwidth requirement for communication of multimedia information;
- selecting a wireless network based upon the bandwidth requirement; and
- communicating messaging via the selected wireless network to establish the communication session.

11. The method of claim 10 wherein the selection of the wireless network comprises:
- i) identifying a wireless network that supports the determined bandwidth requirement and that is supported by the handheld communication device;
- ii) determining remaining battery power of the handheld communication device;
- iii) based on the determined remaining battery power, determining whether sufficient battery power remains to permit operation of the handheld communication device on the identified network;
- iv) if so, employing the identified wireless network;
- v) repeating steps (i) through (iv) if remaining battery power is not sufficient to permit operation of the handheld communication device on the identified network; and
- (vi) providing a user notification if the determined remaining battery power is not sufficient to permit operation of the handheld communication device on any wireless network.

12. The method according to claim 9 wherein associating a respective user-definable display region with a communication session comprises:
- allocating a region of the display device of the handheld communication device; and
- displaying, within the allocated region of the display device, at least a portion of multimedia information communicated during the respective communication session.

13. The method according to claim 9 wherein communicating multimedia information comprises communicating at least one of
- streaming video,
- broadcast video,
- digitized audio,
- a digitized still image, and text.

14. The method of according to claim 9, wherein establishing a communication session using a radio frequency communication network comprises:
- establishing a communication session with a remote network operating according to one of
- a code divisional multiple access (CDMA) cellular protocol,
- a time division multiple access (TDMA) cellular protocol,
- an Institute of Electrical and Electronics Engineers (IEEE) 802.16 protocol, and
- a Digital Video Broadcast-Handhelds (DVB-H) protocol.

* * * * *